United States Patent
Nadkarni et al.

(10) Patent No.: US 8,494,000 B1
(45) Date of Patent: Jul. 23, 2013

(54) INTELLIGENT SLICING OF MONITORED NETWORK PACKETS FOR STORING

(75) Inventors: Rajeev Nadkarni, Chelmsford, MA (US); Narendra Byrapuram, Lowell, MA (US); Mahesh Rajmane, Pune, MA (US); Ashwani Singhal, Andover, MA (US); Anil K. Singhal, Carlisle, MA (US)

(73) Assignee: NetScout Systems, Inc., Westford, MA (US)

( * ) Notice: Subject to any disclaimer, the term of this patent is extended or adjusted under 35 U.S.C. 154(b) by 214 days.

(21) Appl. No.: 12/703,086

(22) Filed: Feb. 9, 2010

Related U.S. Application Data (60) Provisional application No. 61/224,764, filed on Jul. 10, 2009.

(51) Int. Cl.
*H04L 12/26* (2006.01)
(52) U.S. Cl.
USPC ........... 370/469; 370/465; 370/474; 709/223; 709/224
(58) Field of Classification Search
None
See application file for complete search history.

(56) References Cited

U.S. PATENT DOCUMENTS

| | | | |
|---|---|---|---|
| 2008/0120413 A1* | 5/2008 | Mody et al. | 709/226 |
| 2009/0052454 A1* | 2/2009 | Pourcher et al. | 370/392 |
| 2009/0138593 A1* | 5/2009 | Kalavade | 709/224 |
| 2009/0252041 A1* | 10/2009 | Dolganow et al. | 370/241 |
| 2010/0054204 A1* | 3/2010 | Dolganow et al. | 370/331 |
| 2011/0265109 A1* | 10/2011 | Goyet et al. | 725/9 |
| 2011/0280143 A1* | 11/2011 | Li et al. | 370/252 |

* cited by examiner

*Primary Examiner* — Donald Mills
(74) *Attorney, Agent, or Firm* — Fenwick & West LLP (57) ABSTRACT

A network monitor that segments data packets at variable locations of data packets and stores a subset of the segments for troubleshooting or analysis. The network monitor selects data packets to be stored based on a set of user-defined classifier rules and discards other data packets. Each data packets selected for storage are analyzed up to an application protocol layer to determine start locations and/or end locations of data fields in the data packet. A set of user-defined slice rules are applied to each analyzed data packets to segment the data packets at the determined locations of the data fields. A subset of the data packet segments is stored in the network monitor. By storing relevant portions of data packets and discarding other portions of the data packets, the amount of data of data to be stored in the network monitor can be significantly reduced.

18 Claims, 5 Drawing Sheets

INTELLIGENT SLICING OF MONITORED NETWORK PACKETS FOR STORING

CROSS-REFERENCE TO RELATED APPLICATIONS

This application claims priority under 35 U.S.C. §119(e) to U.S. Provisional Patent Application No. 61/224,764 entitled "Intelligent Frame Slicing System and Method," filed on Jul. 10, 2009, the subject matter of which is incorporated by reference herein in its entirety.

FIELD OF THE INVENTION

The present invention is related to monitoring data packets transmitted over a network, more specifically to a method and system for slicing and storing portions of data packets communicated over the network for troubleshooting and analysis.

BACKGROUND OF THE INVENTION

Today's computer networks are extremely complex, with hundreds or more of applications, thousands or more of servers, hundreds or more of locations, hundreds of thousands of clients, and network traffic routed by numerous switches and routers on the computer networks. Network and application data collected from various parts of the network can provide insight into network conditions, but the enormous amount of data present a challenge for data storage, processing, and retrieval.

Many conventional network monitoring systems store network data on a first-in-first-out (FIFO) basis. In these network monitoring systems, older data packets are overwritten with the new data packets. When an event is detected (e.g., detection of an unauthorized access to resources), the data packets currently stored in the network monitoring system may be retrieved and analyzed. However, the network monitoring systems have limited storage capacity. Hence, the network monitoring systems store data packets that go back in time for only a limited period of time. Data packets received before this period is deleted from the network monitoring systems, and thus, are unavailable for troubleshooting or analysis.

Storing the data packets for a longer period of time is advantageous because some network analysis may require data packets that were communicated in the network quite some time ago. However, in order to store data packets for a longer period of time, storage devices with larger capacity are needed in the network monitoring system. Moreover, as the number of stored data packets increases, the time needed to store and retrieve the data packets increases accordingly. The increased time for storage and retrieve may hamper prompt diagnosis and taking of remedial actions.

SUMMARY OF THE INVENTION

Embodiments of the present invention provide a network monitor that segments a data packet for storage at one or more locations that are determined based on an application protocol layer associated with the data packet. The locations of data fields in the data packet are accurately determined by analyzing the data packet at the application protocol layer, and hence, the data packet may be segmented at a location to include data fields relevant to troubleshooting or analysis while discarding other irrelevant or less important data fields. By reducing the amount of data stored per each data packet, the network monitor may retain data packets for a longer period time without the need for increased storage capacity.

In one embodiment, the network monitor selects the data packets to be segmented and stored based on classifier rules. The classifier rules are a set of rules set by a user for selecting the data packets for storing. The network monitor applies the classifier rules to received data packets and chooses the data packets for further processing and storage. The selection of data packets for storage further reduces the amount of data stored in the network monitor.

In one embodiment, at least one of the data fields in the selected data packets has a variable size. Hence, if the data packets are segmented at a fixed bit location, the data packets may be over-inclusive or under-inclusive depending on the size of the data field. By segmenting the data packets based on the analysis of the data packets at the application layer protocol, data packets can be segmented to include only data relevant or important for troubleshooting or analysis.

In one embodiment, the data packets selected for storage are segmented at different locations depending on the application layer protocol associated with the data packet. Each application layer protocol may include different data fields that are useful in troubleshooting or analysis. Hence, the network monitor segments the data packets at different locations of the data packets depending on the application layer protocols associated with the data packets. User-defined slice rules may be deployed in the network monitor. The slice rules define locations at which the data packets should be segmented based on the application layer protocols.

In one embodiment, the classifier rules and slice rules are generated using a graphical user interface or textual grammar. This is advantageous, among other reasons, because users can conveniently set the classifier rules and the slice rules.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the present invention can be readily understood by considering the following detailed description in conjunction with the accompanying drawings.

DETAILED DESCRIPTION OF THE INVENTION

A preferred embodiment of the present invention is now described with reference to the figures where like reference numbers indicate identical or functionally similar elements.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

An application layer protocol described herein refers to any and all communication protocol that allows application programs executed on a computing device in a network to communicate with the same or different application program executed on another computing device in the network. The application layer protocol includes, but is not limited to, the session layer protocol in Open System Interconnection Reference Model (OSI model), the presentation layer protocol in the OSI model, the application layer protocol in the OSI model, and application layer protocol in TCP/IP protocol. The application layer protocol includes, for example, Hyper-Text Transfer Protocol (HTTP), Internet Message Access Protocol (IMAP), Real-time Transport Protocol (RTP), Session Initiation Protocol (SIP), and Independent Computing Architecture (ICA) protocol.

Embodiments of the present invention relate to a network monitor that segments data packets at variable locations of the data packets and stores a subset of the segments for troubleshooting or analysis. The network monitor first selects data packets to be stored based on a set of user-defined classifier rules and discards other data packets. Each data packets selected for storage are analyzed up to an application protocol layer to determine start locations and/or end locations of data fields in each data packet. A set of user-defined slice rules are then applied to each selected data packets to segment the data packets at the determined locations of the data fields. A subset of the data packet segments is stored in the network monitor. By storing relevant portions of data packets and discarding other portions of the data packets, the amount of data to be stored in the network monitor can be significantly reduced.

Overview of System Architecture

Figure 1:
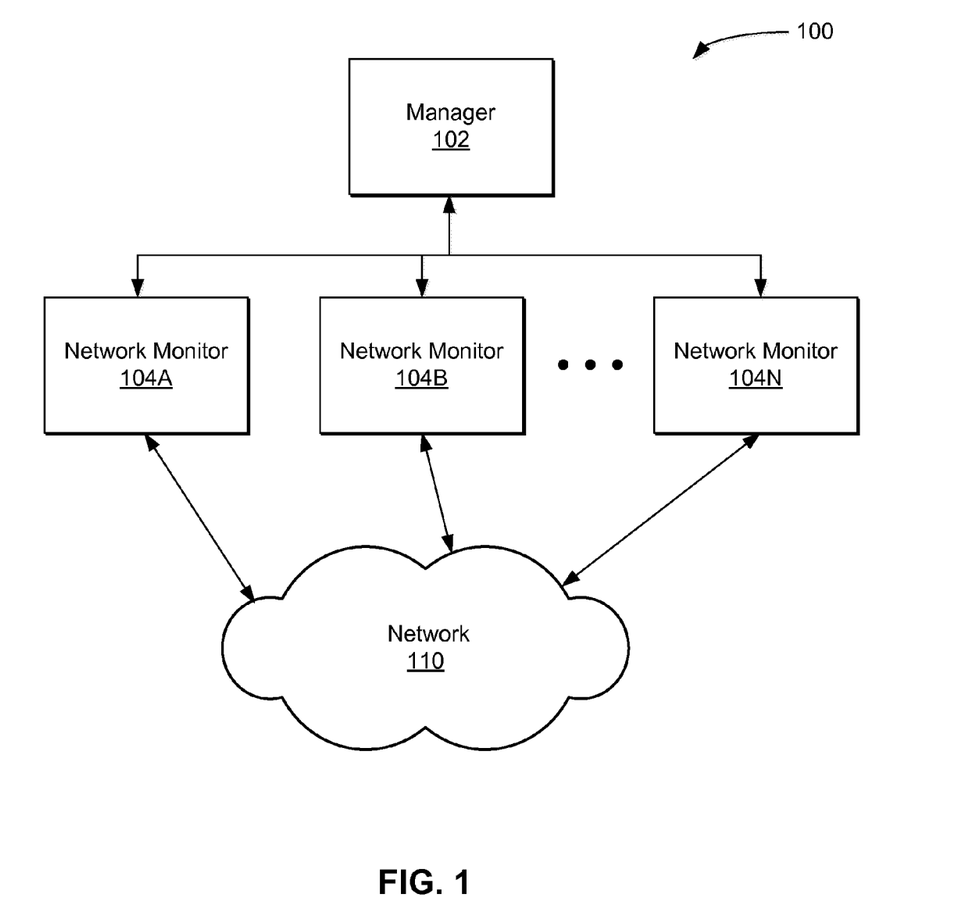
FIG. 1 illustrates architecture of a system for monitoring network data, according to one embodiment of the present invention.

FIG. 1 illustrates architecture of a system 100 for monitoring network data packets, according to one embodiment of the present invention. The network system 100 of FIG. 1 may include, among other components, a manager 102, one or more network monitors 104A through 104N (hereinafter collectively referred to as "the network monitors 104") and a network 110. The network monitors 104 are connected to the network 110 to monitor data packets at certain locations or links of the network 110. The locations or the links connected to the network monitors 104 are preferably critical or important locations of the network 110.

The manager 102 is connected to the network monitors 104 to set various operating parameters. Although the manager 102 is illustrated as being directly connected to the network monitors 104, the manager 102 may communicate with the network monitors 104 via the network 110 or other networks. The network monitors 104 may be located remotely from the manager 102. Alternatively, the manager 102 may be co-located with one of the network monitors 104 or embodied in one of the network monitors 104.

The manager 102 is hardware, software, firmware or a combination thereof for managing the operation of the network monitors 104. The manager 102 may perform one or more of the following functions: (i) receive parameters from a user for setting the operation of the network monitors 104, (ii) send commands to the network monitors 104 to set parameters or preferences for their operations, (iii) collect information from the network monitors 104, (iv) present the collected information to the user, (v) generate reports concerning conditions and performance of the network 110, (vi) analyze packet flows based on the collected information to assist the user to resolve issues in the network 110, and (vii) provide alarms and alerts on predefined events (e.g., network utilization reaching a limit or detecting critical errors in the network 110). The manager 102 may be embodied as a general purpose computing device installed with specialized software for performing one or more of these operations or embodied as a specialized computing device.

The network monitors 104 are hardware, software, firmware or combinations thereof for monitoring data communication at various locations or links of the network 110. Each of the network monitors 104 may be deployed at certain locations or links of the network 110 to collect network data traversing the locations or links to which the network monitors 104 are connected. After collecting the network data, the network monitors 104 process (e.g., segment) the network data, and store the processed network data, as described below in detail with reference to FIG. 4. When needed, the network data stored in the network monitors 104 may be accessed, for example, via the manager 102 or directly via the network monitors 104.

The network monitor 104 may be a special purpose computing device or a software component (not limited to a single process) dedicated to monitor data communicated via the network 110. Alternatively, the network monitor 104 may be a general purpose computing device with specialized software components installed thereon.

The network 110 may comprise a local area network (LAN), a wide area network (WAN) (e.g., the Internet), and/or any other interconnected data path across which multiple devices may communicate. The network 110 may include various network devices operating at different levels of protocol.

Example Architecture of Network Monitor

Figure 2:
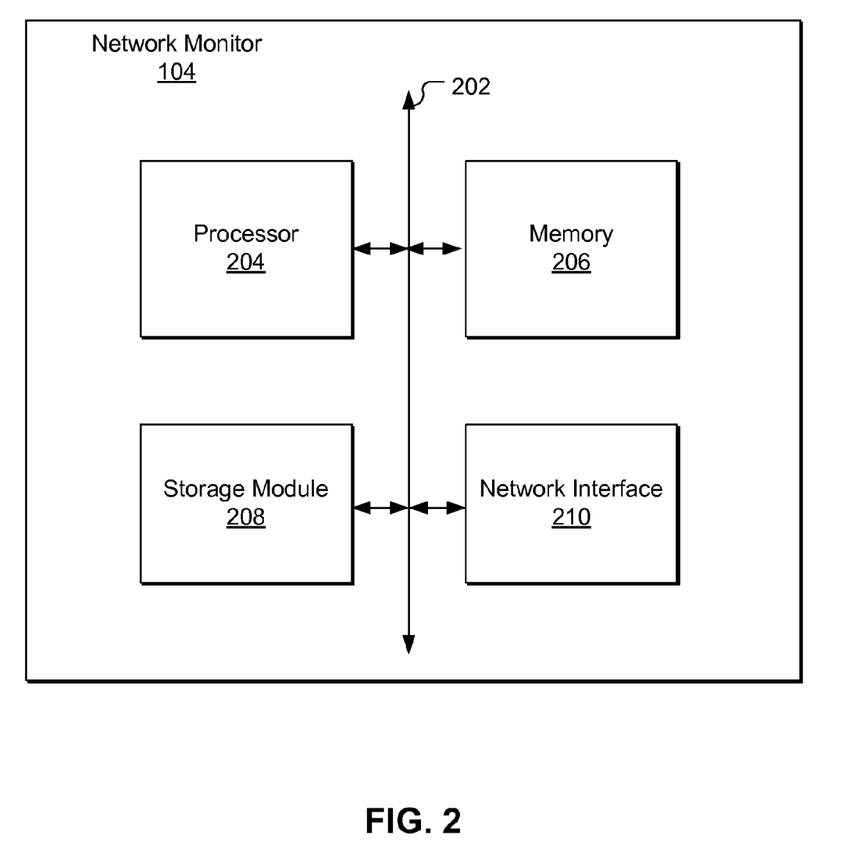
FIG. 2 is a block diagram of a network monitor in FIG. 1, according to one embodiment of the present invention.

FIG. 2 is a block diagram of a network monitor 104, according to one embodiment of the present invention. The network monitor 104 may include, among other components, a processor 204, memory 206, a storage module 208, and a network interface 210. These components are connected and communicate via a bus 202. The network monitor 104 may also include other components such as user input devices (e.g., keyboard and mouse) and display devices (e.g., a display driver card).

The processor 204 executes computer instructions stored in the memory 206 and/or the storage module 208. Although only a single processor is illustrated in FIG. 2, two or more processors may be used to increase the computing capacity and the processing speed of the network monitor 104. In one embodiment, the processor 204 is embodied as two E5400 Xeon Quad-core processors from Intel Corporation of Santa Clara, Calif.

The memory 206 is a computer readable storage medium that stores, among other data, computer instruction modules for processing, storing and/or retrieving the network data, as described below in detail with reference to FIG. 3. In one embodiment, the memory 206 is a primary storage device (e.g., Random-Access Memory (RAM)) having a faster access speed compared to the storage module 208.

The storage module 208 may be a secondary storage device for storing, among others, the processed network data. The storage module 208 may be embodied, for example, as a solid-state drive, hard disk or other memory devices capable of storing a large amount of data compared to the memory 206. In one embodiment, the network data received at the network monitor 104 are stored and then deleted on a first-in-first-out (FIFO) basis.

The network interface 210 may include a NIC (network interface card) or other standard network interfaces to receive network data, and to communicate with other network interface devices coupled to the network 110. For example, the network interface 210 may be an Ethernet interface, a WiFi (IEEE 802.11) interface, or other types of wired or wireless network interfaces. In one embodiment, two or more network interfaces may be used to communicate with different types of networks or perform specialized functions.

The components of the network monitor 104 of FIG. 2 are merely illustrative. In alternative embodiments, the storage module 208 may be omitted. In this embodiment, all the information is stored in the memory 206.

In one embodiment, the network monitor 104 is embodied as InfiniStream appliance that is available from NetScout Systems of Westford, Mass.

Example Modules for Processing and Storing Network Data

Figure 3:
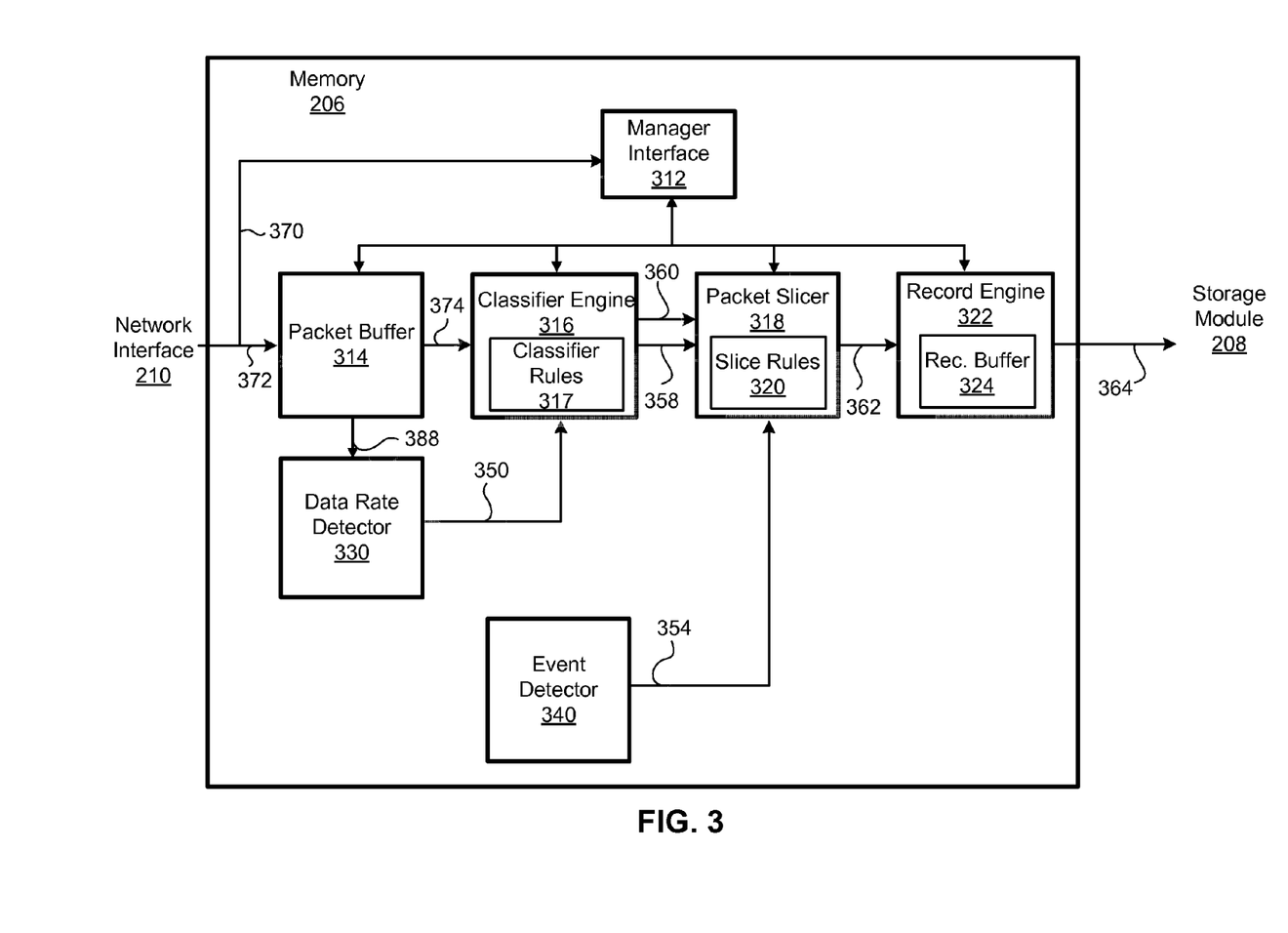
FIG. 3 is a block diagram of software components in the network monitor of FIG. 2, according to one embodiment of the present invention.

FIG. 3 is a block diagram of software components of the network monitor 104, according to one embodiment of the present invention. The memory 206 may store, among others instruction modules, a manager interface 312, a packet buffer 314, a classifier engine 316, a packet slicer 318, a record engine 322, a data rate detector 330, and an event detector 340. Although these components are illustrated in FIG. 3 as being embodied as software components, one or more of these components may also be embodied as hardware, firmware or a combination of hardware, firmware and software. Further, one or more of the software components may be combined into a single software module. Alternatively, each of the software components in FIG. 3 may be divided into multiple software modules.

The manager interface 312 communicates with the manager 102, among other purposes, to receive parameters 370 associated with the operation of the network monitor 104. The parameters 370 received from the manager 102 may include, among others, the following: (i) classifier rules indicating which data packets are to be stored, (ii) slice rules indicating which portions of data packets should be stored, (iii) if the storage of data packets are event driven, the events that should prompt storage of the data packets or modify portions of data packets to be stored, and (iv) threshold data rates for changing the operation associated with processing or storing of a critical and non-critical data packet. Alternatively, these parameters are received from a user directly at the network monitor 104 instead of receiving these parameters from the manager 102.

After receiving the parameters from the manager 102, the manager interface 312 sends instructions to the packet buffer 314, the classifier engine 316, the packet slicer 318 and the record engine 322 to operate according to the received parameters. The manager interface 312 may also collect information from these modules and/or the storage module 208 and send the collected information to the manager 102.

The packet buffer 314 receives network data in the form of data packets 372 and temporarily stores them for processing by the classifier engine 316. In one embodiment, the packet buffer 314 is a first-in-first-out (FIFO) buffer. The packet buffer 314 also provides data rate information 388 to the data rate detector 330.

The classifier engine 316 is connected to the packet buffer 314 to receive the buffered data packets 374. The classifier engine 316 analyzes the data packets at one or more layers of the communication protocol to determine whether the data packets should be stored in the storage module 208. For this purpose, the classifier engine 316 stores the classifier rules 317 set by the user. Based on the classifier rules 317, the classifier engine 316 selects the data packets 358 and forwards the selected data 358 to the packet slicer 318. The classifier engine 316 determines characteristics of the data packets (e.g., associated application layer protocol, end user entities, and session status). Then the classifier engine 316 applies the classifier rules 317 to the determined characteristics of the data packets to store or discard the data packets.

For example, the classifier engine 316 analyzes the data packet at a transport layer to determine if the data packet is flagged as having a high priority. The classifier 316 may select the high priority data packets for storage while discarding other data packets. In another example, the classifier engine 316 may determine application layer protocols associated with the data packets and select data packets associated with certain application layer protocols. By analyzing the data packets at various communication protocol layers, the classifier engine 316 can more adequately select the data packets for storage.

The classifier engine 316 then forwards the selected data packets 358 and classification information 360 to the packet slicer 318. The classification information indicates the characteristics of the data packet as determined by the classifier engine 316. The classification information indicates, for example, (i) whether the data packet is flagged as having a higher priority, (ii) the application layer protocols associated with the data packets, and (iii) the end user entities transacting and the status of the session.

The packet slicer 318 receives the selected data packets 358, and slices the data packets 358 into one or more segments based on the classification information received. Segment(s) important for troubleshooting or analysis is marked as critical to the recording module and sent while other segment(s) are discarded. While the data packets may be segmented in more than one segment, all critical segment(s) will be stored together. In one embodiment, the packet slicer 318 slices the data packets at variable bit locations so that the segment to be stored includes data important for troubleshooting or analysis.

To segment the data packets and/or select data packet segments for storage, the packet slicer 318 stores slice rules 320 that may be compiled at the manager 102 or at the network monitor 104. The packet slicer 318 receives the classification information 360, and performs additional analysis of the data packet, as needed, to segment the data packets and/or select segments for storage. Then the slice rules 320 are applied to the data packets based on the classification information 360 and the analysis to slice the data packets at a desired bit location.

After the data packets are segmented at the packet slicer 318, the segments 362 of the data packets to be stored are sent to the record engine 322. Other segments are discarded and not sent to the record engine 322.

The slice rules 320 may set bit locations at which to slice the data packets differently based on factors such as (i) the application layer protocols associated with the data packets, (ii) whether the data packets are flagged as being important or urgent, (iii) the originating address or destination address of the data packets, (iv) port numbers associated with the data packets, (v) the size of the data packets, and (vi) the application layer session status and any alerts raised by the classifier engine 316 Importantly, the packet slicer 318 stores information about application layer protocols to analyze the characteristics of the data packets at the application layer. Based on the information about application layer protocols, the packet slicer 318 may determine which data bits in the data packets represent which data fields (e.g., header or payload), and segments the data packets at bit locations corresponding to start or end of certain data fields according to the slice rules 320.

Because the packet slicer 318 analyzes the data packets at the application layer protocol, the packet slicer 318 can segment the data packets at desired bit locations even if one or more data fields in the data packets have variable sizes. The segments 362 for storage include only data fields of the data packets that the user deemed necessary for troubleshooting or analysis. The segments 362 for storage also have a smaller size compared to the entire data packets. Hence, the storing segments 362 (as opposed to storing the entire data packet) significantly reduces the data stored in the storage module 208 without sacrificing the data that may be needed for troubleshooting or analysis.

The record engine 322 stores the segments 362 of selected data packets in the storage module 208. For this purpose, the record engine 322 may include a record buffer 324 to temporarily store the segments 362 before sending the buffered segments 364 to the storage module 208 for longer storage.

In one embodiment, the data rate detector 330 determines the rate of data received at the network monitor 104, for example, by monitoring the number of data packets queued in the packet buffer 314. In another embodiment, the data rate detector 330 receives data rate information from the network interface 210. The data rate detector 330 sends data rate signal 350 representing the data rate to the classifier engine 316. In response to the data rate signal 350, the classifier engine 316 may increase or decrease the types of data packets to be stored.

For example, if the data rate is below a first threshold (e.g., 50 kB/sec), the classifier engine 316 may store all incoming data packets. If the data rate is at or above the first threshold, the classifier engine 316 may store data packets associated with important or critical application layer protocols but discard other data packets. Multiple rate thresholds may be set to modify the types of data packets stored gradually. Controlling the types of data packets stored depending on the data rate is advantageous because, among other reasons, the classifier engine 316 does not become a bottleneck impeding the overall process at the network monitor 104 even when a large amount of data is received at the network monitor 104 while ensuring that critical data are stored in the storage module 208.

In one embodiment, multiple sets of classifier rules 317 are stored in the classifier engine. Different set of classifier rules 317 become active depending on the data rate of the data packets at the network monitor 104. If the data rate is below a threshold, a first set of classifier rules 317 may be used to select more data packets for storage. Conversely, if the data rate is at or above the threshold, a second set of classifier rules 317 may be used to select less data packets for storage.

In one embodiment, the event detector 340 detects events that may trigger increased portions of the data packets to be stored in the storage module 208. The event detector 340 may receive event threshold or event trigger data, for example, from other components of the network monitor 140 or the manager 102. The event threshold or event trigger data may generate an alert and cause the event detector 340 to increase the portions of the data packets to be stored. The event detected at the event detector 340 may include, for example, a hacking attempt, failure of one or more devices associated with an application protocol layer, installation of new network devices or applications, and restricted access policy violations (e.g., prohibited FTP (File Transfer Protocol) transfer of files and authentication failures).

In response to detecting the event, the event detector 340 sends a signal 354 to the packet slicer 318 instructing the packet slicer 318 to modify the slicing operations. For example, if the signal 354 indicates that hacking is being attempted, detection of violation of restricted access policy, the packet slicer 318 may store the entire data packets (without segmenting) or store increased portions of the data packets that may be related to the hacking attempt. The slice rules 320 may include a set of rules that are applicable when no event is present and another set of rules that become applicable upon detection of an event.

Packet Slicing Configuration

In one embodiment, a user can specify which parts of data packets are to be stored in the storage module 208 using textual grammar or graphical user interface. The grammar or graphical user interface allows the users to specify precisely where a data packet should be segmented, not based on a fixed bit offset in the data packet, but by describing the slicing location in terms of data fields (e.g., protocol header and/or protocol data).

In one example, assume that a user wants the network monitor 104 to store portions of data packets associated with Hypertext Transfer Protocol (HTTP) traffic up to the Uniform Resource Locator (URL) for troubleshooting or subsequent analysis. The URL in HTTP packets is of a variable length. Hence, if the user sets the parameters to store first N bytes (where N is an integer) of the data packets, the URL may be cut off if the URL is excessively long. In contrast, if the URL is too short, the first N bytes may include additional data following the URL that is not needed for troubleshooting or subsequent analysis. Therefore, segmenting the data packets based on fixed bit offset may result in an over-inclusive data segment or an under-inclusive data segment.

The textual grammar may allow users to conveniently set bit locations where the HTTP packets are to be sliced by defining data fields in the application layer protocols associated with the data packet. For example, to slice the HTTP packets at the exact bit location, the user may set the slice rule related to this option by providing the following configuration input:

Interface 1-3: SLICE@HTTP+GETREQ+URL

The configuration input indicates that a data packet associated with HTTP GET messages (GETREQ) on interfaces 1 through 3 should be sliced at a bit location where URL ends. Such configuration input, along with other configuration input, may be compiled into the slice rules 320 at the manager 102 or the network monitors 104, and deployed at the packet slicer 318. The packets slicers 318 segment any data packets associated with HTTP protocol at the bit location where the URL ends, if the data packets are on monitored interfaces 1 through 3 or any other interfaces necessary enforce the configuration input.

In another example, assume that a user wants to store only application layer headers in data packets associated with audio stream transmitted using the real-time transport (RTP) protocol. The RTP header may come at variable lengths (for example, depending on whether the data link layer has tunneling, VLAN (Virtual LAN) tagging or MPLS (Multiprotocol Label Switching) labeling enabled), and therefore, slicing at a fixed bit location may result in an over-inclusive or under-inclusive data segment. In this case, the user may provide a configuration input as follows:

Interface 4: SLICE@RTPHDR

This configuration input indicates that all RTP data packets should be sliced at a bit location where the RTP header (RTPHDR) ends, and discard the data bits after the header (RTPHDR). As in the above example of HTTP GET message, the configuration input is sent as part of the slice rule to the packet slicer 318 for deployment.

The above examples of textual grammar are merely illustrative. Other conditions or flow control may be used to implement more complex segmenting of data packets.

In one embodiment, the slice rules 320 are generated at the manager 102 using a graphical user interface tool. The graphical user interface tool allows a user to conveniently select the parameters associated with the classifier rules 317 and the slice rules 320. After the classifier rules 317 and the slice rules 320 are received from the user, the manager 102 may automatically update the network monitors 104 with the new rules.

In one embodiment, a user may set both global rules and local rules. The global rules include classifier rules 317 and slice rules 320 that are applicable to all network monitors 104 connected to the manager 102. The local rules include classifier rules 317 and slice rules 320 that are applicable to a subset of the network monitors 104 connected to the manager 102. The graphical user interface tool of the manager 102 may allow the user to conveniently set a configuration input as a global rule or a local rule.

In one embodiment, the user may be provided with default slice rules. The user can opt to change only a subset of the default slice rules. In this way, the user can reduce the time consumed in creating the slice rules 320. Alternatively, two or more default slice rules may be available to the user. The user may conveniently select one of these default slice rules for deployment at the packet slicer 318 instead of individually setting each slice rule.

Process of Selecting and Slicing Data Packet for Storage

Figure 4:
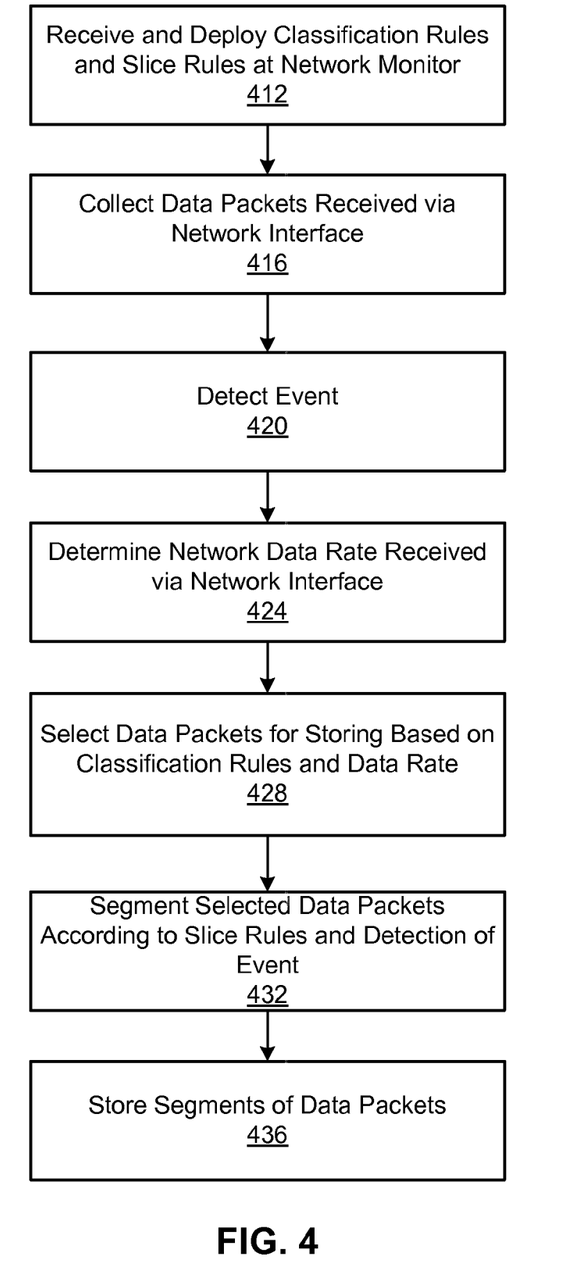
FIG. 4 is a flowchart illustrating the process of selecting and segmenting data packets for storage in a network monitor, according to one embodiment of the present invention.

FIG. 4 is a flowchart illustrating the process of selecting and segmenting data packets for storing in the network monitor 104, according to one embodiment of the present invention. First, the classifier rules 317 and the slice rules 320 are received and deployed 412 at the network monitor 104. The classifier rules 317 and the slice rules 320 may be provided manually by the user at the network monitor 104 or the manager 102.

The data packets are then collected 416 via the network interface 210. The collected data packets are buffered in the packet buffer 314 for subsequent processing by the classifier engine 316 and the packet slicer 318.

In one embodiment, the event detector 340 detects 420 presence of an event such as hacking attempt or a critical error in the network 110. Data needed to determine the presence of such an event may be received from the manager 102 or other components of the network monitor 104.

In one embodiment, the data rate detector 330 determines 424 the rate of data packets received at the network monitor 104. The data rate may be determined based on information received from the packet buffer 314 or the network interface 210.

Based on the classifier rules 317 and the data rate (as detected by the data rate detector 330), the classifier engine 316 selects 428 data packets for storing in the network monitor 104. The classifier rules 317 may have different sets of rules applicable at different data rates. In one embodiment, data packets that are important or critical are selected for storage while other data packets are discarded and not stored in the network monitor 104.

The packet slicer 318 then segments 432 the selected data packets at bit locations as defined by the slice rules 320 according to the slice rules 320 and presence of events (as detected by the event detector 340). If an event (e.g., hacking attempt) requiring storage of data segments of increased size is detected, the packet slicer 318 may store the entire data packets or slice out less portions of the data packets.

The data packet segments 362 processed by the packet slicer 318 are temporarily stored in the recording buffer 324 and then stored 436 in the storage module 208 by the record engine 322.

One or more steps illustrated in FIG. 4 may be omitted. For example, the step 420 of detecting the event to store data packets and/or the step 424 of determining network data rate may be omitted. Further, the sequence of steps as illustrated in FIG. 4 is not restrictive. For example, the step 420 of detecting the event to store data packets may follow the step 444 of determining the network data rate.

Figure 5:
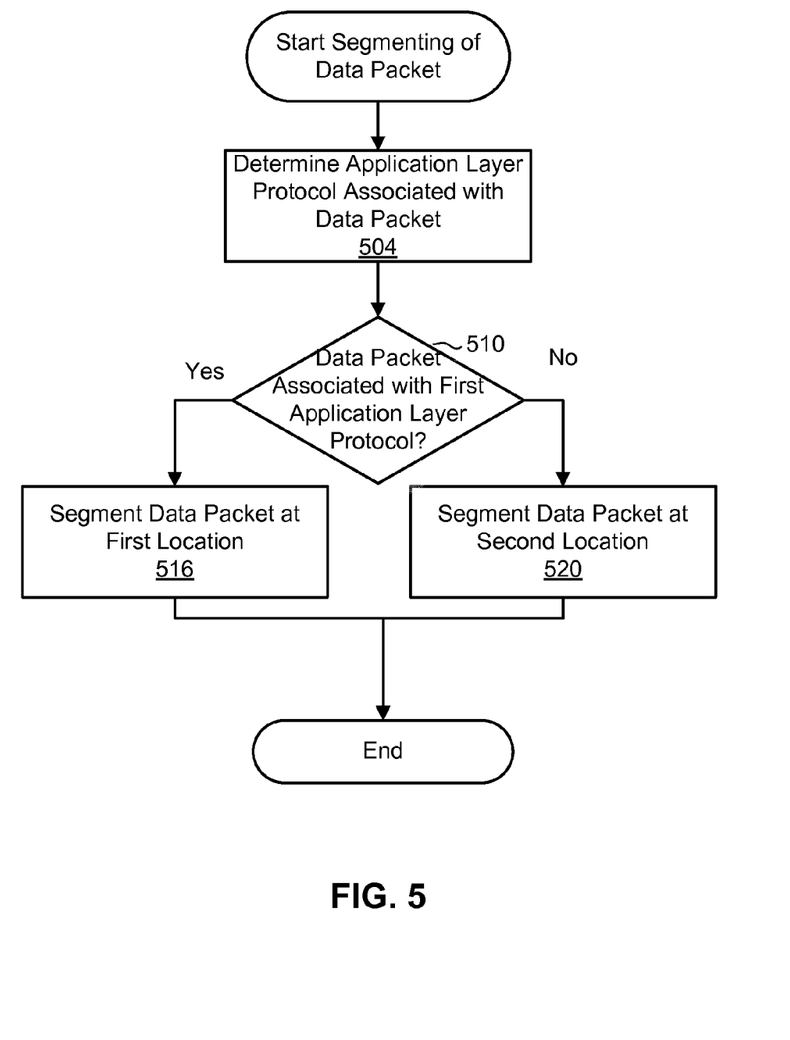
FIG. 5 is a flowchart illustrating in detail the process of segmenting data packet, according to one embodiment of the present invention.

FIG. 5 is a flowchart illustrating in detail the step 432 of segmenting data packets, according to one embodiment of the present invention. Assume, for the sake of explanation, that all the data packets received at the network monitor 104 are either data packets associated with a first application layer protocol (e.g., RTP protocol) or data packets associated with a second application layer protocol (e.g., HTTP protocol). First, the packet slicer 318 determines 504 which application layer protocol a data packet is associated with.

If it is determined 510 that the data packet is associated with the first application layer protocol, the data packet is segmented 516 at a first location (e.g., after the last bit of the RTP header in RTP protocol).

In contrast, if it is determined 510 that the data packet is associated with the second application layer protocol, the data packet is segmented 520 at a second location (e.g., after the last bit representing the URL in HTTP protocol).

By performing analysis up to the application protocol layer of the data packet and segmenting data packets accordingly, packet storage space and input/output bandwidth of the storage module 208 may be used more efficiently. As a result, the storage module 208 may store data packets going further back in time without increasing the storage capacity of the network monitor 104. This allows users to more accurately diagnose issues, resolve the issues or analyze conditions in the network 110.

Although the present invention has been described above with respect to several embodiments, various modifications can be made within the scope of the present invention. Accordingly, the disclosure of the present invention is intended to be illustrative, but not limiting, of the scope of the invention, which is set forth in the following claims.

What is claimed is:

1. A method for storing network data, comprising:
receiving a plurality sets of classifier rules, each set of classifier rules defining data packets to be stored;
receiving data packets at a location in a network for monitoring;
selecting a set of classifier rules from the plurality sets of classifier rules based on data rates of the data packets at the location;
selecting data packets associated with an application layer protocol having at least one data field of a variable size based on the selected set of classifier rule, responsive to receiving the data packets;
determining at least a start location of the at least one data field and an end location of the at least one data field in each of the selected data packets by analyzing each of the selected data packets;
segmenting each of the selected data packets based on the start location and the end location into two or more segments; and
storing a subset of the two or more segments, wherein said subset includes less than all of said two or more segments.

2. The method of claim 1, further comprising:
determining application layer protocols associated with the selected data packets;
segmenting the selected data packets at a first location responsive to determining that the selected data packets are associated with a first application protocol layer; and
segmenting the selected data packets at a second location responsive to determining that the selected data packets are associated with a second application protocol layer.

3. The method of claim 1, further comprising receiving slice rules, set by a user to define segments of the selected data packets to be stored.

4. The method of claim 3, wherein the classifier rules and slice rules are generated using a graphical user interface or textual grammar.

5. The method of claim 1, further comprising shifting the start location or the end location responsive to detecting an event that requires increasing a size of the segment being stored.

6. A network monitor for storing network data, comprising:
a network interface configured to receive data packets at a location in a network for monitoring;
a classifier engine coupled to the network interface, the classifier engine configured to:
receive a plurality sets of classifier rules, each set of classifier rules defining data packets to be stored,
select a set of classifier rules from the plurality sets of classifier rules based on data rates of the data packets at the location, and
select data packets associated with an application layer protocol having at least one data field of a variable size based on the selected set of classifier rule, responsive to receiving the data packets;
a packet slicer coupled to the classifier engine, the packet slicer configured to:
determine at least a start location of the at least one data field and an end location of the at least one data field in each of the selected data packets by analyzing each of the selected data packets; and
segment each of the selected data packets based on the start location and the end location into two or more segments; and
a storage module coupled to the packet slicer, the storage module configured to store a subset of the two or more segments.

7. The network monitor of claim 6, wherein the packet slicer is configured to:
determine application layer protocols associated with the selected data packets;
segment the selected data packets at a first location responsive to determining that the selected data packets are associated with a first application protocol layer; and
segment the selected data packets at a second location responsive to determining that the selected data packets are associated with a second application protocol layer.

8. The network monitor of claim 6, wherein the network interface is further configured to receive slice rules set by the user to define segments of the selected data packets for storing.

9. The network monitor of claim 8, wherein the classifier rules and slice rules are generated using a graphical user interface or textual grammar.

10. The network monitor of claim 6, further comprising an event detector for detecting an event that require increase in a size of the segment being stored, the packet slicer coupled to the event detector to shift the start location or the end location responsive to detecting the event.

11. A non-transitory computer readable storage medium structured to store instructions, the instructions when executed, cause a processor to:
receive a plurality sets of classifier rules, each set of classifier rules defining data packets to be stored;
receive data packets at a location in a network for monitoring;
select a set of classifier rules from the plurality sets of classifier rules based on data rates of the data packets at the location;
select data packets associated with an application layer protocol having at least one data field of a variable size based on the selected set of classifier rule, responsive to receiving the data packets;
determine at least a start location of the at least one data field and an end location of the at least one data field in each of the selected data packets by analyzing each of the selected data packets;
segment each of the selected data packets based on the start location and the end location into two or more segments; and
store a subset of the two or more segments, wherein said subset includes less than all of said two or more segments.

12. The computer readable storage medium of claim 11, further comprising instructions to:
determine application layer protocols associated with the selected data packets;
segment the selected data packets at a first location responsive to determining that the selected data packets are associated with a first application protocol layer; and
segment the selected data packets at a second location responsive to determining that the selected data packets are associated with a second application protocol layer.

13. The computer readable storage medium of claim 11, further comprising instructions to receive slice rules set by the user to define segments of the selected data packets to be stored.

14. The computer readable storage medium of claim 13, wherein the classifier rules and slice rules are generated using a graphical user interface or textual grammar.

15. The computer readable storage medium of claim 11, further comprising instructions to shift the start location or the end location responsive to detecting an event that requires increasing a size of the segment being stored.

16. The method of claim 1, further comprising:
marking the subset of the two or more segments for storage based on whether each of the selected data packets are flagged as having priority; and
discarding segments other than the marked subset.

17. The method of claim 1, wherein the segmenting each of the selected data packets is further based on a size of each of the selected data packets.

18. The method of claim 5, wherein the event comprises one or more of a hacking attempt, failure of one or more devices associated the application protocol layer, installation of a network device or application, and a violation of restricted access policy.

* * * * *